Aug. 5, 1958
J. R. MORISON
2,845,796
WAVE FORCE METER
Filed July 12, 1954
2 Sheets-Sheet 1
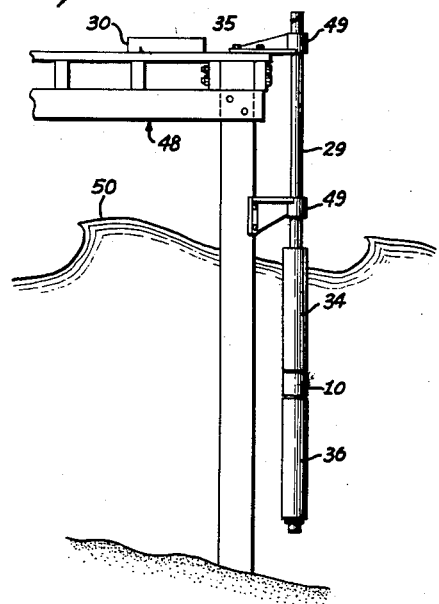
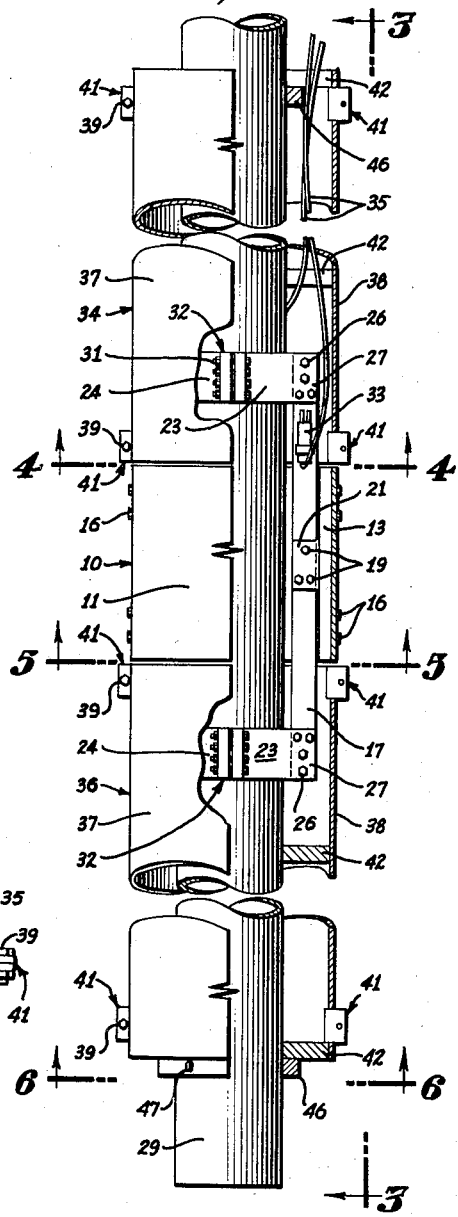
JACK R. MORISON,
INVENTOR.
Huebner, Beehler,
Worrel & Herzig.
Attorneys.
By:

Aug. 5, 1958 J. R. MORISON 2,845,796
WAVE FORCE METER
Filed July 12, 1954 2 Sheets-Sheet 2
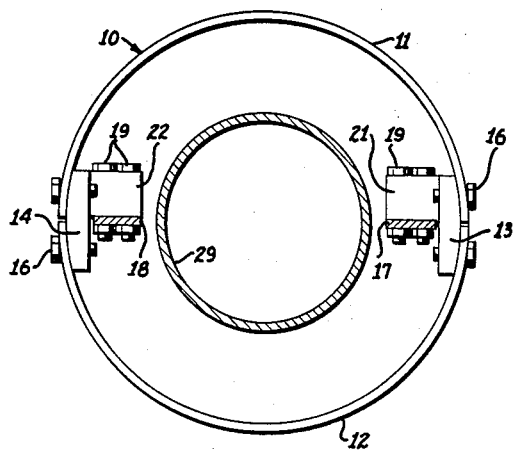
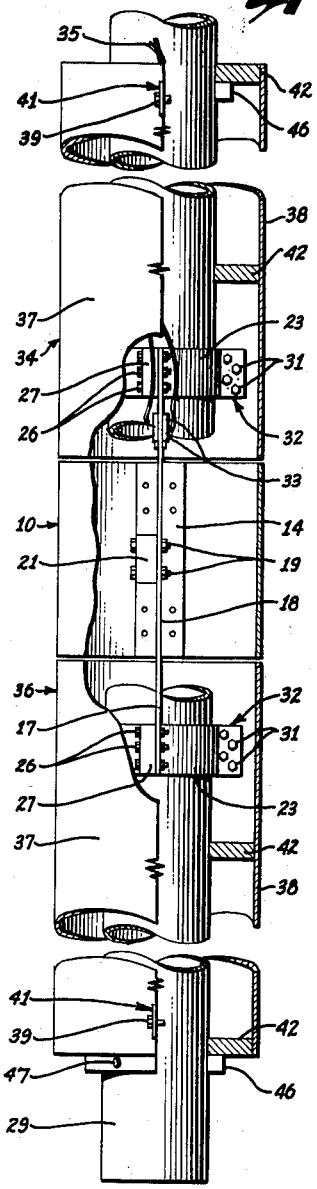
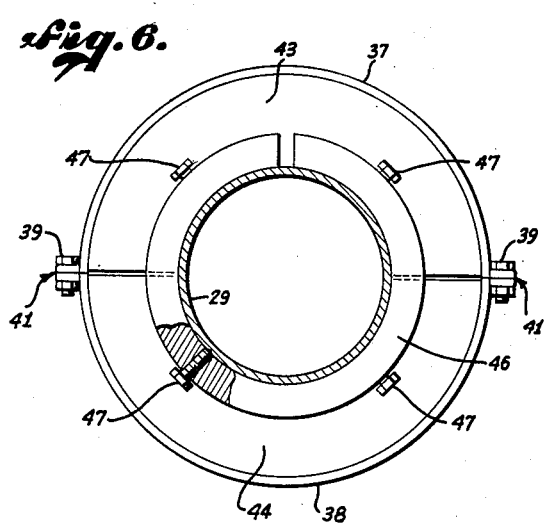
JACK R. MORISON,
INVENTOR.
Huebner, Beehler,
Worrel & Herzig.
Attorneys.

United States Patent Office 2,845,796
Patented Aug. 5, 1958

2,845,796
WAVE FORCE METER

Jack R. Morison, El Cerrito, Calif., assignor to The Regents of the University of California, Berkeley, Calif., a corporation Application July 12, 1954, Serial No. 442,777

5 Claims. (Cl. 73—170)

The present invention relates to a device for measuring the forces of waves exerted on a movable section, such as a section of a pile, and relates particularly to a meter for continuously measuring and recording such forces.

In the proper design and construction of structures near large bodies of water and in the construction of piers over the surface of bodies of water it is desirable to obtain data on the forces of waves acting on various types of piling and at various depths below the surface of water. Such engineering data is valuable in connection with off-shore oil drilling projects, and in connection with the construction of viaducts and docks, for example.

Accordingly, it is an object of the present invention to provide a versatile wave force meter of wide applicability as to size and shape of pile to be tested.

Another object of the invention is to provide a wave force meter capable of being used to measure wave forces at various selected depths below the surface of a body of water.

It is an additional object of the invention to provide a wave force meter having a rugged construction, relatively light weight, ready portability, and convenient installation features.

Broadly stated, the wave force meter of my invention comprises a moveable force section, or meter section, preferably a section of piling, mounted restrainedly but elastically by means such as vertical restraining bars, for example, and force measuring means for measuring the magnitude of the forces of waves acting on the force section. I prefer to measure the magnitude of the wave forces indirectly by measuring the motion produced in the elastically mounted force section, or piling section, and this I prefer to do by measuring the deformation produced in the elastic mounting means of the force section rather than by measuring directly the motion of the section. In addition, I prefer to make the wave force measurements continuously and to record them continuously. I have found that a strain gage may be used to continuously measure the deformation of the above-mentioned restraining bars by the wave forces.

A more detailed description of an embodiment of my invention will be given below with reference to the drawings, wherein—

Figure 1 is an isometric elevational view showing a wave force meter attached for use to a pier by means of brackets;

Figure 2 is a partial elevational view with parts of the pile sections broken away to show their mountings;

Figure 3 is a similar view taken on line 3—3 of Figure 2;

Figure 4 is a cross-sectional view taken on line 4—4 of Figure 2;

Figure 5 is a similar view taken on line 5—5; and

Figure 6 is a similar view taken on line 6—6.

The moveable force section, or meter section 10, is shown to be a section of piling of circular cross-section but may be of any desired cross-section or shape. It is shown to be constructed of two hemi-cylinders 11 and 12 (Fig. 5) bolted to clamping plates 13 and 14 by studs 16. This design makes for ease of transportation and assembly of the meter section at the water site.

The clamping plates 13 and 14 are shaped to fit snugly and tightly against the inside walls of meter section 10 at the lines of juncture of the hemi-cylindrical sections 11 and 12 to form a rigid cylindrical section of piling. These clamping plates 13 and 14, are, in turn, tightly bolted to the middle sections of restraining bars 17 and 18, respectively, by bolts 19 passing through lugs 21 and 22 formed on the clamping plates, as shown in Figures 2, 3 and 5.

Restraining bars 17 and 18 are similarly tightly bolted at both ends to clamping ring half-sections 23 and 24, respectively, by bolts 26 passing through lugs 27 and 28 formed on the clamping ring half-sections. These half-sections 23 and 24 fit snugly around a supporting pipe or pole 29 to which they are tightly bolted by bolts 31 passing through clamps 32.

It will be observed that meter section 10 is held rigidly to pipe 29 by restraining bars 17 and 18 to the middle sections of which it is tightly connected. Thus the meter section 10 is restrained from moving freely. However, in view of the fact that there is elasticity in the restraining bars 17 and 18, the application of a force against the outer surface of the meter section 10, will cause a slight movement of the meter section because of the bending deformations produced in the restraining bars 17 and 18. By using flat restraining bars the movement produced in meter section 10 is confined to the horizontal plane and a single vertical plane; the magnitude thereof depends upon the dimensions and other strength properties of the restraining bars.

The bending deformations or strains produced in restraining bars 17 and 18 are, therefore, directly related to the force applied to the surface of meter section 10, and a direct measurement of the strain produced in the restraining bars is at the same time an indirect measurement of the force applied to the meter section by an outside agency, such as a wave acting on the submerged meter section. Although the motion of the meter section is small, of the order of about 0.06 inch, the bending deformation or strain produced in the restraining bars can be accurately measured by the use of any of various available methods and equipment. I prefer to use strain gages such as the SR-4 bonded electric strain gage. Four strain gages may be attached to the restraining bars 17 and 18 as shown at 33 in Figures 2, 3 and 4. These strain gages continuously convert changes of strain, due to corresponding changes of force acting on the meter section 10, into changes of electrical current passing through the gages. These changes in electrical current are transmitted by cables 35 to a suitable electric recording instrument 30 of any convenient type available on the market.

In order to more accurately measure the horizontal wave forces acting on the meter section 10 and to very closely simulate a pile of infinite length extending vertically to the bottom of a very deep body of water, such as the sea, I prefer to attach a fixed pile section of the same diameter and general shape as the meter section 10 both above and below the meter (moveable) section 10. The fixed pile sections 34 and 36 may be of any convenient length, such as about six times that of the meter section 10. Like meter section 10 they are conveniently made of hemi-cylindrical sections 37 and 38 bolted tightly together by bolts 39 passing through clamps 41 fixed as by welding, to sections 37 and 38, as shown in Figure 4.

Support and centering rings 42, consisting of half-sections 43 and 44, are fixed in horizontal planes inside the hemi-cylindrical sections 37 and 38, such as by welding so that the divisional edges of the half-ring sections 43 and 44 substantially coincide with those of the hemi-cylindrical sections 37 and 38, respectively, as shown in Figure 6. The inner peripheries of the half-ring sections 43 and 44 are dimensioned to fit snugly around the outer surface of pipe 29 when bolts 39 are tightened to center and rigidly support fixed pile sections 34 and 36 on pipe 29. Pile sections 34 and 36 are positioned above and below meter section 10 by C-rings 46 fitted around pipe 29 below the upper support ring 42 of pile section 34 and the lower support ring 42 of pile section 36, respectively, as shown in Figures 2 and 3. The C-rings are fixed to pipe 29 by set screws 47 threaded into the C-rings into tight engagement with pipe 29.

Finally, the pipe or pole 29 is mounted at the site in any suitable manner, such as on a pier 48 (Figure 1), by any convenient means such as brackets 49, so that the meter section 10 is submerged to the desired depth below the waves indicated at 50.

It will be observed that the parts of the wave force meter just described are largely fitted together by bolts for ease of assembly, dis-assembly and portability, and for ease of making changes in the internal components of the meter at the site. By virtue of this design restraining bars 17 and 18 of different cross-section and strength can be installed in the meter section 10 to measure wave forces of various magnitudes due to waves of various sizes. It is desirable to make these changes readily as the waves change with varying wind and tide conditions, for example.

The following is an example of the dimensions used in an actual wave force meter. The meter section 10 and the fixed pile sections 34 and 36 were 1 ft. in diameter. The meter section was 1 ft. long and the fixed pile sections were each 6 ft. long. Three sets of restraining bars 17 and 18 were used in this meter. Each set was about 26 inches long and about 2 inches wide. A set made of aluminum was about $3/8$ inch thick and had four equally spaced channels $3/4$ inch wide and $3/16$ inch deep cut across the restraining bars. Another set was of steel about $5/16$ inch thick with four similar channels of $5/32$ inch depth. A third set also was of steel about $1/2$ inch thick with channels of $1/4$ inch depth. The mounting pipe 29 was 6 inches in diameter.

The wave force meter of my invention is an improvement over previously used instruments because of its higher natural frequency, greater versatility of size and shape of pile that can be tested, greater ease of handling and more rigid supporting structure. Another unique feature of my wave force meter is that the depth below the water surface for force measurement can be selected at will. This feature is an invaluable asset in the analysis of the wave force data and for comparison of these data with the various theories on the subject. The use of my wave force meter reduces the work of data analysis to only a small fraction of that required in the use of previous types of instruments.

Although I have shown and described specific embodiments of my wave force meter, I am aware that many modifications thereof are possible. My invention, therefore, is not to be restricted except as necessitated by the prior art and by the spirit of the appended claims.

I claim:

1. A wave force meter comprising a moveable pile section mounted adjacent similar fixed pile sections, restraining bars attached to the fixed pile sections and connected to the moveable pile section for rigidly and elastically holding the moveable section, mounting means for positioning the pile sections below the surface of a body of water, and strain gage means mounted on the restraining bars for continuously measuring and recording the deformation of the restraining bars resulting from movement of the moveable pile section caused by the action of waves thereon.

2. A wave force meter comprising a moveable pile section, a fixed pile section positioned coaxially adjacent and above the moveable pile section, a second fixed pile section positioned coaxially and below the moveable pile section, mounting means for positioning the three pile sections below the surface of a body of water, restraining bars attached to the fixed pile sections and connected to the moveable pile section for rigidly and elastically holding the same, and strain gage means mounted on the restraining bars for continuously measuring and recording the deformation of the restraining bars resulting from movement of the moveable pile section caused by the action of waves thereon.

3. A wave force meter comprising a moveable pile section, a fixed pile section positioned coaxially adjacent and above the moveable pile section, a second fixed pile section positioned coaxially adjacent and below the moveable pile section, vertical restraining bars attached to the fixed pile sections and connected to the moveable pile section for rigidly and elastically holding the same in an axially vertical position, clamp mounting means for attaching the three pile sections to a vertical support means, strain gage means mounted on the restraining bars and recording means operatively connected to said strain gage means for continuously measuring and recording the deformation of the restraining bars resulting from movement of the moveable pile section caused by the action of waves thereon.

4. A wave force meter comprising an elongated member adapted to be mounted vertically in a body of water, an intermediate section of said member, comprising an outer-surface-forming portion thereof, being mounted thereon for lateral movement, at least one resilient member restraining lateral movement of said intermediate section, and strain gage means responsive to distortion of said resilient member for measuring the force applied to said intermediate section.

5. A wave force meter as defined in claim 4, wherein said resilient member comprises an elongated resilient element extending in the direction of length of said first mentioned member and having its ends fixed thereto, said intermediate section being fixed to the mid-portion of said elongated element.

References Cited in the file of this patent

UNITED STATES PATENTS

| 2,543,020 | Hess | Feb. 27, 1951 |
| 2,544,738 | Tint | Mar. 13, 1951 |
| 2,761,320 | Duntley | Sept. 4, 1956 |
| 2,813,424 | Liepmann et al. | Nov. 19, 1957 |

FOREIGN PATENTS

| 41,953 | Australia | Apr. 25, 1910 |
| 631,973 | Great Britain | Nov. 14, 1949 |
| 1,036,873 | France | Apr. 29, 1953 |